United States Patent [19]

Griffin

[11] Patent Number: 5,754,962
[45] Date of Patent: May 19, 1998

[54] METHOD AND APPARATUS FOR INDICATING AN OPERABLE OR NON-OPERABLE CONNECTION BETWEEN A PORTABLE RADIO AND A VEHICLE KIT

[75] Inventor: Lee Daniel Griffin, Raleigh, N.C.

[73] Assignee: Ericsson Inc., Research Triangle Park, N.C.

[21] Appl. No.: 508,016

[22] Filed: Jul. 27, 1995

[51] Int. Cl.$^6$ ........................................... H04B 1/40
[52] U.S. Cl. .................. 455/569; 455/127; 455/571
[58] Field of Search .................... 455/89, 90, 95, 455/99, 345, 346, 351, 344, 127, 67.7, 569, 571; 379/58, 420, 446, 447, 455

[56] References Cited

U.S. PATENT DOCUMENTS

| | | | |
|---|---|---|---|
| 3,500,293 | 3/1970 | Cocco | 339/113 |
| 4,636,741 | 1/1987 | Mitzlaff | 330/127 |
| 4,673,861 | 6/1987 | Dubovsky et al. | 320/2 |
| 4,679,026 | 7/1987 | Knakowski et al. | 340/63 |
| 4,850,006 | 7/1989 | Sasaki et al. | 379/58 |
| 4,893,348 | 1/1990 | Andoh | 455/89 |
| 4,962,523 | 10/1990 | Tanaka | 379/58 |
| 4,974,251 | 11/1990 | Ohta et al. | 379/61 |
| 5,033,109 | 7/1991 | Kawano et al. | 455/90 |
| 5,184,971 | 2/1993 | Williams | 446/142 |
| 5,261,121 | 11/1993 | Hashimoto | 455/89 |
| 5,287,553 | 2/1994 | Korycan | 455/89 |
| 5,303,395 | 4/1994 | Dayani | 455/127 |
| 5,423,083 | 6/1995 | Stellmach | 455/127 |
| 5,584,055 | 12/1996 | Murui et al. | 455/89 |

FOREIGN PATENT DOCUMENTS

| | | | |
|---|---|---|---|
| 0494780 | 7/1992 | European Pat. Off. | H04B 1/40 |
| 0573856 | 12/1993 | European Pat. Off. | H04B 1/38 |

OTHER PUBLICATIONS

"User's Guide and Installation Manual—MAC 320E," Celline pp. 1–3, 6–7.

*Primary Examiner*—Nguyen Vo
*Assistant Examiner*—Lee Nguyen
*Attorney, Agent, or Firm*—David G. Matthews

[57] ABSTRACT

A system and method for indicating to a user that an operable-connection or non-operable connection has been made between a portable radio and a vehicle kit forming a mobile communication system. The system determines if an operable-connection has been made by determining if a hands-free-request signal, an external power signal, and an external antenna signal are present. Detection of the hands-free-request signal, external power signal, and external antenna signal are indicative that the portable radio and vehicle kit are operably connected such that the mobile communication system is fully operational. An operable-connection alert indicative of an operable connection between the portable radio and vehicle kit is generated by a radio display and an external speaker in response to a determination that the hands-free signal, external power signal and external antenna signal are present. In the preferred embodiment, the external antenna signal is determined by either comparing a measured received signal strength indicating (RSSI) with a reference RSSI value or detecting an increase in RSSI after inserting the portable radio into the cradle of the vehicle kit.

9 Claims, 5 Drawing Sheets

FIG. 3

| Signal | PORTABLE RADIO Function | Input (I)/ Output (O) | System and Antenna Interface Terminal |
|---|---|---|---|
| ATMS | Audio to portable radio. | I | 1 |
| PWRSRC | Indicates external power supply is present. | I | 2 |
| LSPCTRL | Hands-free loudspeaker control - on/off. | O | 3 |
| AGND | Analog ground, ATMS and AFMS return. | PWR | 4 |
| AFMS | Audio from portable radio. | O | 5 |
| SWDC5 | Indicates whether the portable radio is powered or not. Also supply source of low currents: Ipeak < 10 mA Iaverage < 5 mA. | O | 6 |
| ICTRL | Control of charging current. | O | 7 |
| DGND | Logic ground and DC return. | PWR | 8 |
| VPPFLASH | Service only (NOT USED WITH VEHICLE KIT). | I | 9 |
| HANDS-FREE REQUEST (HOOK) | Audio path control. | I | 10 |
| DTMS | Data to portable radio. | I | 11 |
| DFMS | Data from portable radio. Can also be used to determine whether the phone is powered on or not (instead of SWDC5): If during an interval of 100 ms, this signal is not high at any time, the phone is powered off (or not present). Otherwise the portable radio is on. | O | 12 |
| ONSRQ | On/Off and service request. | I | 13 |
| DCIN | Power Supply Voltage<br>• Vmin > 5.0 V<br>• Vmax < 8.5 V (tolerate max. 8.5 V input). | PWR | 14 |
| EXTERNAL ANTENNA SIGNAL | External antenna signal to portable radio. | I | External Antenna Terminal |

METHOD AND APPARATUS FOR INDICATING AN OPERABLE OR NON-OPERABLE CONNECTION BETWEEN A PORTABLE RADIO AND A VEHICLE KIT

FIELD OF THE INVENTION

The present invention relates generally to radio communications, and more particularly to portable radios connectable to vehicle kits.

BACKGROUND OF THE INVENTION

Portable radios are designed to be small and compact to allow users to conveniently carry and use the portable radios. Due to their compact size, portable radios have reduced antenna gain and limited battery capacity compared to mobile radios. In addition, hand-held use of a portable radio while driving can be awkward.

When used in a vehicle, these problems associated with portable radios can be eliminated or minimized through use of a vehicle kit. A vehicle kit is a communications accessory electrically connected to an external antenna on a vehicle, a vehicle battery, and a hands-free unit that provides for hands-free voice operation of the portable radio.

The vehicle kit includes a cradle into which a compatible, portable radio can be inserted to operably connect the portable radio to the vehicle kit. Connection of the portable radio to the vehicle kit results in a mobile communication system being formed where the portable radio is electrically connected to the external antenna, vehicle battery, and the hands-free unit. By connecting the portable radio in this manner, the portable radio has improved antenna gain, increased radio battery capacity by charging, and can be used in a hands-free voice mode such that the user has both hands available for driving.

In order for the mobile communication system to operate properly, the portable radio must be operably connected with the vehicle kit. More specifically, the necessary electrical connections between the portable radio and vehicle kit must be made. The necessary electrical connections between the portable radio and vehicle kit are made by mating electrical interfaces located on the cradle of the vehicle kit and on the portable phone. The mating electrical interfaces of the vehicle kit and portable radio each include a plurality of different electrical terminals typically formed by pin connectors.

The portable radio is designed to be operably connected to the vehicle kit by inserting the portable radio into the cradle of the vehicle kit such that the electrical interfaces of the portable radio and vehicle kit mate. If the portable phone is improperly inserted into the cradle of the vehicle kit or there is a mechanical misalignment between the electrical interfaces, an incomplete or non-operable connection between the electrical interfaces will occur and the mobile communication system will not be fully operational.

In the prior art, a user had no effective way to determine whether an operable electrical connection had been made and the mobile communication system was fully operational. To determine whether an operable connection had been made, the user had to resort to visually inspecting the mechanical interface between the portable radio and vehicle kit or had to listen for a mechanical "snap" as the portable radio was pressed into the cradle.

Accordingly, a user positioning a portable radio in the cradle of a vehicle kit cannot be certain that a proper electrical connection has been made between the portable radio and vehicle kit. A user's uncertainty as to whether a proper connection has been made can be annoying to the user. In addition, incomplete connection of the portable radio to the vehicle kit can result in the user unknowingly discharging the battery of the portable radio, missing incoming calls, or having poor reception and transmission.

SUMMARY OF THE INVENTION

The method and apparatus of the present invention encompasses generating an operable connection alert in response to a determination that selected electrical terminals of a portable radio and vehicle kit have been connected. A connection of these selected terminals is indicated to the user by an operable connection alert which can include an audio alarm and a displayed message indicating that an operable-connection has been made. The operable-connection alert provides assurance to a user that a portable radio and vehicle kit are operably connected. In the preferred embodiment, the operable-connection alert is generated in response to a determination that the hands-free terminals, external power terminals and external antenna terminals of the portable radio and vehicle kit are connected.

The operable-connection alert is generated in response to a determination of the connection of the hands-free terminals, external power terminal and external antenna terminals because of the criticality of the connection of these terminals to the operation of the mobile communication system. The connection of the hands-free terminals results in a hands-free-request signal that indicates to the portable radio that the hands-free unit is connected to the portable radio and ready for use. Connection of the external power terminals connects the external power supply to the portable radio, and results in an external power signal being directed to the portable radio. The external power signal powers the portable radio and may also recharge the portable radio battery. The connection of the external antenna terminals connects the portable radio to an external antenna, and results in an external antenna signal being inputted to the portable radio. The external antenna signal is a radio signal received by the external antenna and inputted to the radio and logic unit of the portable radio. The external antenna signal typically results in an improved received signal strength indicator (RSSI) at the portable radio compared to the RSSI resulting from the radio signal received by the portable radio antenna located in the vehicle.

The connection of the critical terminals is determined by the portable radio sensing signals resulting from and associated with the connection of the critical terminals. An operable-connection alert is generated in response to a determination that the hands-free signal, external power supply signal, and external antenna signal are present. A non-operable-connection alert is generated if the hands-free signal and external power supply signal are present and the external antenna signal is not present.

By providing both an operational alert and a non-operational alert, a user is able to assuredly determine whether the portable radio has made an operational connection with the vehicle kit and is ready for operation.

3

FIG. 3 is a table listing system and antenna interface terminals for a preferred embodiment portable radio according to the present invention.

Figure 4:
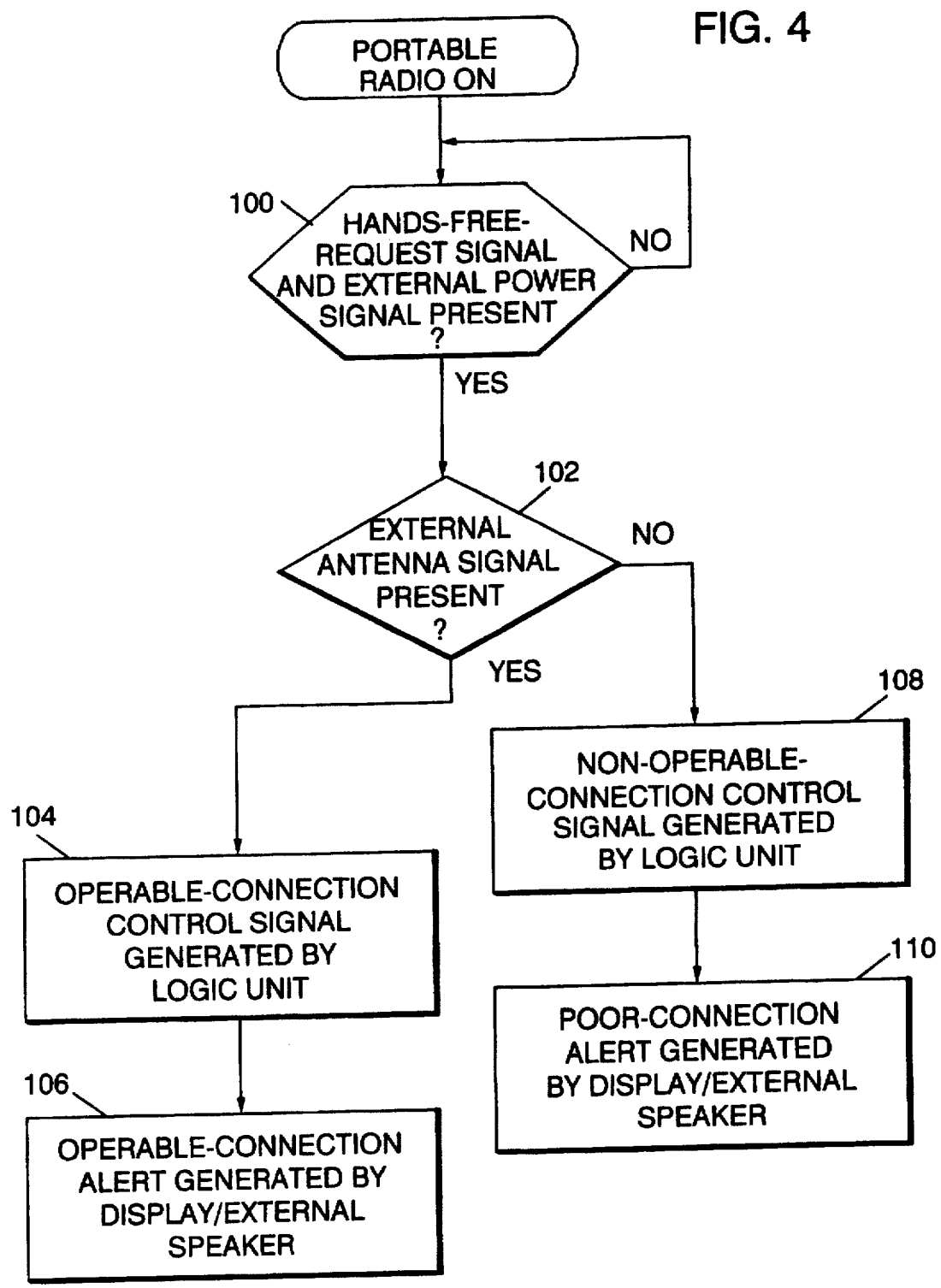

FIG. 4 is a flow chart showing a general method of operation of the portable radio according to the present invention.

Figure 5:
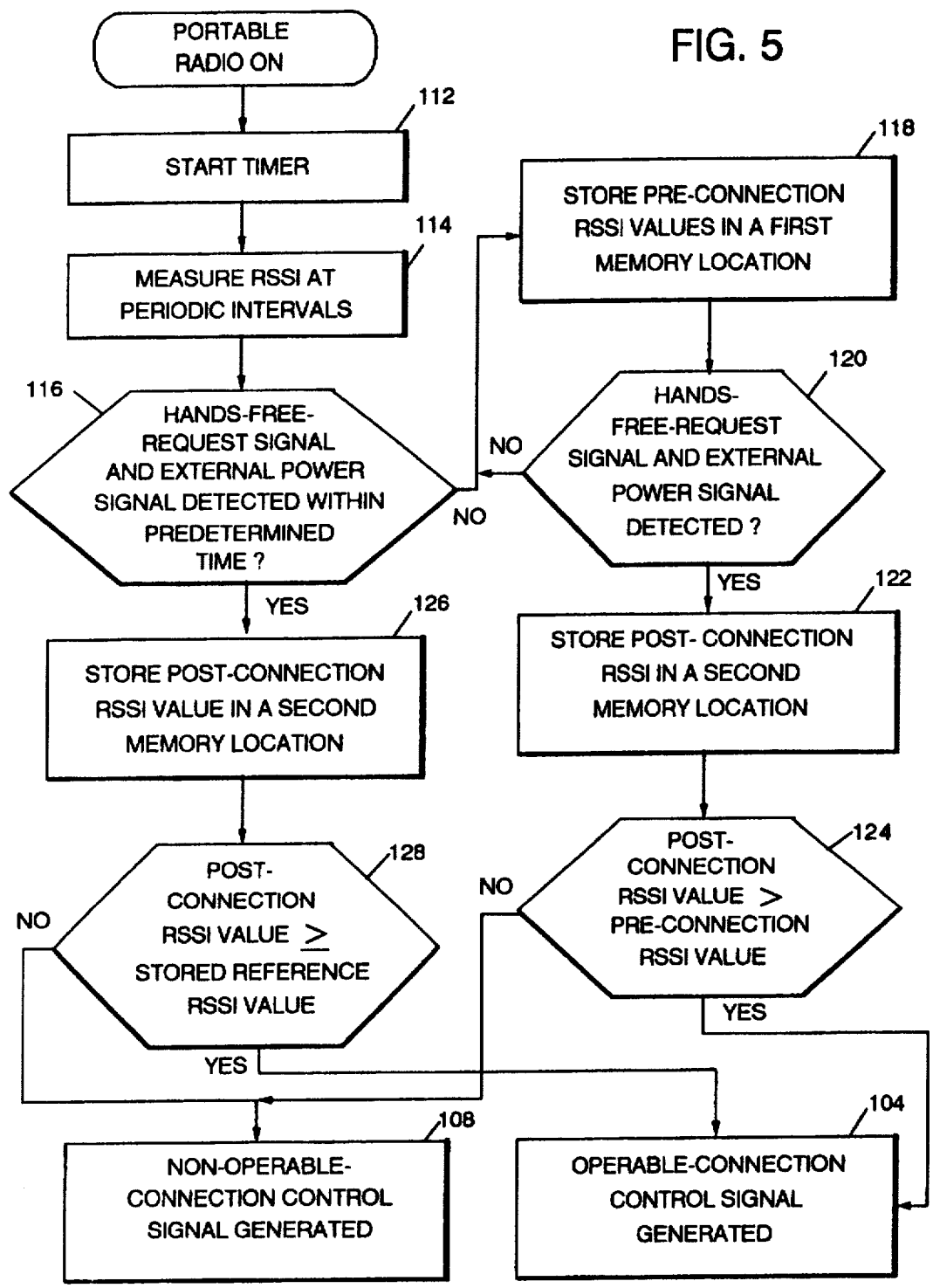

FIG. 5 is a flow chart showing a method of determining the presence of an external antenna signal according to the present invention.

DETAILED DESCRIPTION OF THE PREFERRED EMBODIMENTS

The system and method of the present invention provides a user with an alert indicating whether an operable or non-operable connection has been made between a portable radio and a vehicle kit forming a mobile communication system for use in a cellular system. The alert gives the user positive feedback, alerting the user as to whether an operable or non-operable connection has been made between the portable radio and vehicle kit.

Figure 1:
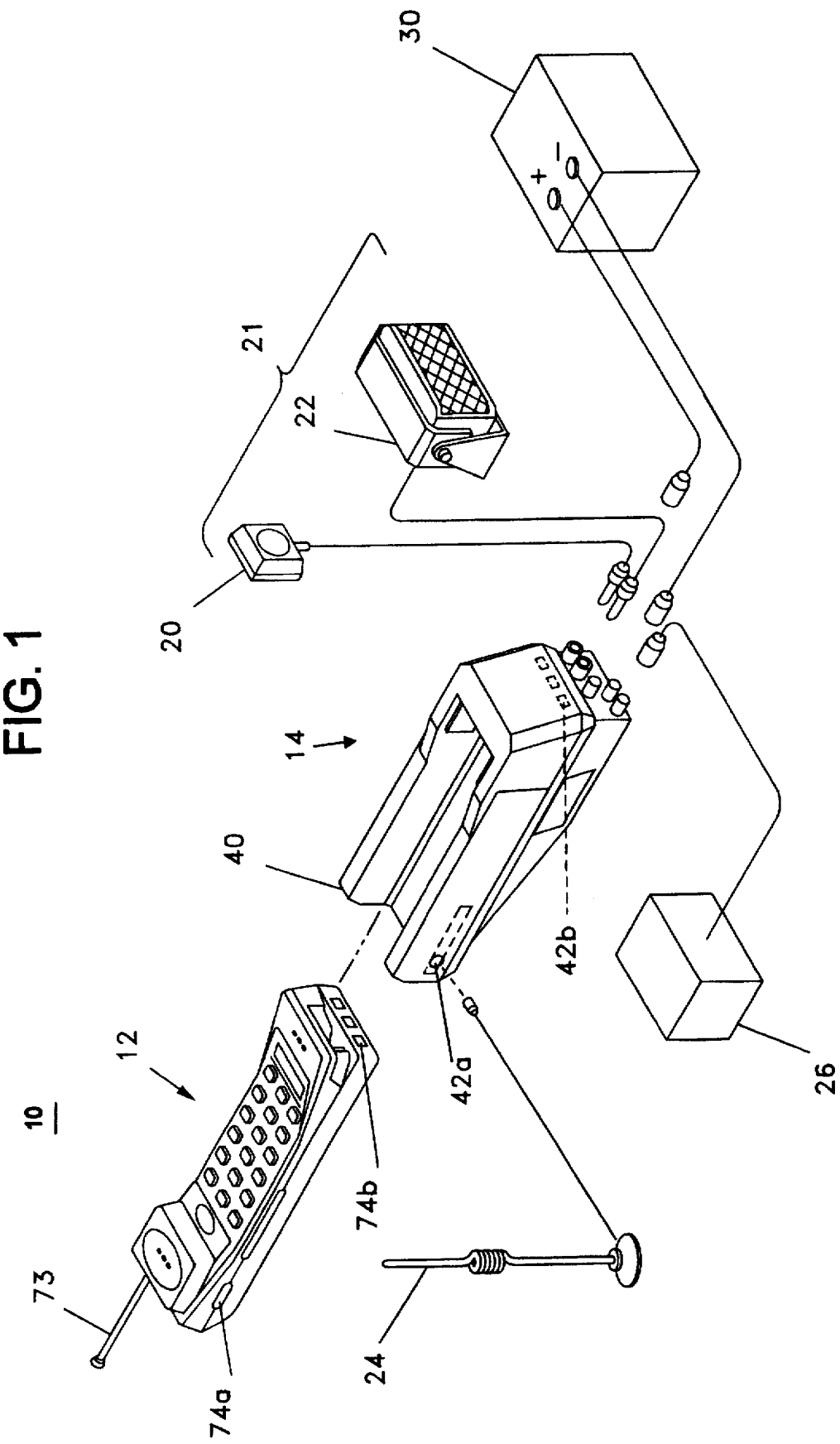
FIG. 1 is a schematic perspective view of a mobile communication system including a portable radio and a vehicle kit according to the present invention.
Figure 2:
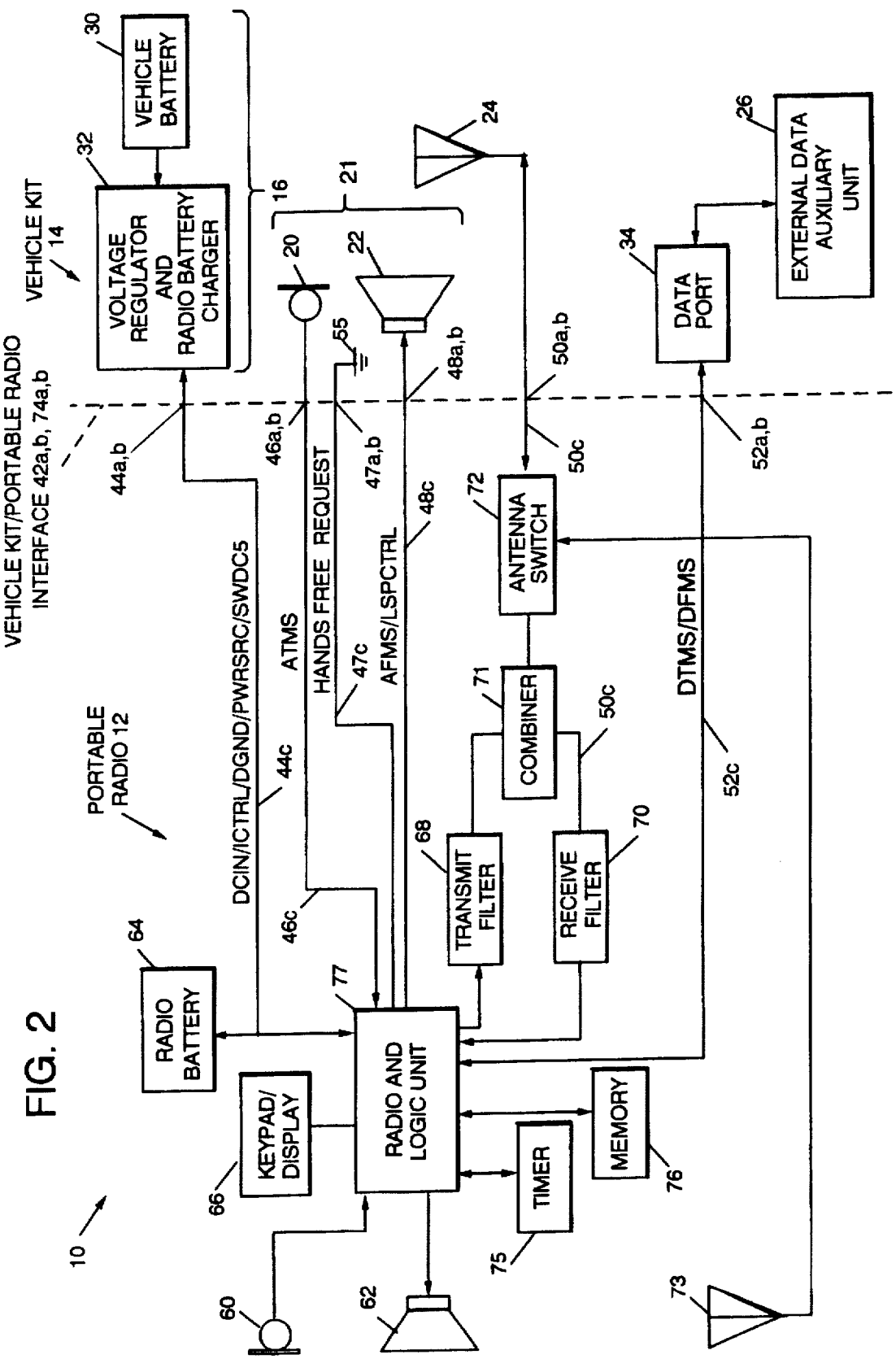
FIG. 2 is a block diagram of a mobile communication system showing a portable radio connected to a vehicle kit according to the present invention.

Referring to FIGS. 1 and 2, a mobile communication system 10 according to the present invention is shown. Mobile communication system 10 includes a portable radio 12 and a vehicle kit 14 connected to an external power supply 16, external microphone 20 and external speaker 22 referred to as a hands-free unit 21, external antenna 24, and external data auxiliary unit 26. The external power supply 16 is formed by a vehicle battery 30 and a voltage regulator and radio battery charger 32. The external data auxiliary unit 26 can be a fax machine and is connected to a data port 34 as shown in FIG. 2.

The portable radio 12 and vehicle kit 14 are adapted to be operably connected to form the mobile communication system 10. The vehicle kit 14 is a conventional vehicle kit such as the Sammy vehicle kit produced by Ericsson Inc., 1 Triangle Drive, P.O. Box 13969, Research Triangle Park, N.C. 27709. The vehicle kit 14 includes a cradle 40 having an cradle electrical interface 42 electrically connected to the external power supply 16, external microphone 20, external speaker 22, external antenna 24, and external auxiliary unit 26. The cradle electrical interface 42 of the vehicle kit 14 includes a plurality of electrical terminals designed to mate with corresponding terminals of the portable radio 12. As shown in FIG. 1, the cradle electrical interface 42 includes an antenna interface 42a located at one end of the cradle 40, and a general electrical system interface 42b located at an opposite end of the cradle 40.

The portable radio 12 is adapted to be inserted into the cradle 40 of vehicle kit 14 to form the mobile communication system 10. In the preferred embodiment, the portable radio is a conventional radio telephone which has been adapted according to the present invention to provide an alert indicative of an operable-connection. An example of a conventional portable radio is the Dolly Jane telephone produced by Ericsson Inc., 1 Triangle Drive, P.O. Box 13969, Research Triangle Park, N.C. 27709. The portable radio 12 includes a conventional microphone 60, earpiece 62, radio battery 64, keypad and display 66, transmit filter 68, receive filter 70, combiner 71, antenna switch 72, radio antenna 73, and portable radio electrical interface 74. The portable radio 12 further includes a timer 75 and memory 76 which are connected to a radio and logic unit 77. The radio and logic unit 77 is programmed, as discussed below, to determine whether an operable or non-operable connection has been made between the portable radio 12 and vehicle kit 14.

4

As shown in FIG. 1, the portable radio electrical interface 74 of the portable radio 12 includes an antenna interface 74a located at a top portion of the portable radio 12, and a general electrical system interface 74b located at a lower portion of the portable radio 12. The portable radio electrical interface 74 of the portable radio 12 includes a plurality of terminals, in a preferred embodiment, the portable radio 12 includes the conventional terminals listed and described in FIG. 3.

The terminals of particular interest for the preferred embodiment of the portable radio 12 and vehicle kit 14 are schematically shown in FIG. 2. The terminals located at the general electrical system interface 42, 74b are designated as interface terminals 1–14 in FIG. 3 and the external antenna terminals 50a,b are located at the antenna interface 42a, 74a. The DCIN, ICTRL, DGND, and PWRSRC terminals are used in connecting the external power supply 16 of the vehicle kit 14 to the portable radio 12. Collectively the DCIN, ICTRL, DGND, PWRSRC and SWDC5 of the portable radio 12 will be referred to as the external power supply terminals 44a. The vehicle kit 14 has corresponding external power supply terminals 44b. When the external power supply terminals 44a,b are connected, external power supply circuits 44c are formed and external power supply 16 powers the portable radio 12 and charges the radio battery 64.

The ATMS terminals or external microphone terminal 46a of the portable radio 12 is used in connecting the portable radio 12 to the external microphone 20 of the hands-free unit. The vehicle kit 14 has corresponding external microphone terminals 46b. When the external microphone terminals 46a,b are connected, an external microphone circuit 46c is formed and radio from external microphone 20 is provided to the radio and logic unit 77.

The AFMS and LSPCTRL terminals or external speaker terminals 48a of the portable radio 12 are used to connect the portable radio 12 to the external speaker 22. The vehicle kit 14 has a corresponding external speaker terminals 48b. When the external speaker terminals 48a,b are connected, an external speaker circuit 48c is formed and audio from radio and logic unit 77 is provided to external speaker 22.

The hands-free request terminal or hook 47a is used to connect the portable radio 12 to ground 55. The vehicle kit 14 has a corresponding hands-free request terminal 47b that is connected to ground 55. When the hands-free request terminals 47a,b are connected, a hands-free request circuit 47c is formed and a hands-free-request signal is transmitted to radio and logic unit 77.

The external antenna terminal 50a of the portable radio 12 connects the portable radio 12 to the external antenna 24. The vehicle kit 14 has a corresponding external antenna terminal 50b. The external antenna terminal 50a includes the antenna switch 72 which connects the external antenna 24 to combiner 71 and disconnects radio antenna 73 when external antenna terminals 50a,b are connected. When the external antenna terminals 50a,b are connected, an external antenna circuit 50c is formed and external antenna signals are provided to antenna switch 72 from external antenna 24.

The DTMS and DFMS terminals or data terminals 52a are used to connect the portable radio 12 to data auxiliary unit 26. Vehicle kit 14 includes a corresponding data terminal 52b. When the data terminals are connected, a data circuit 52c is formed and data is transmittable between radio and logic unit 77 and data auxiliary unit 26.

The radio and logic unit 77, timer 75 and memory 76 of the portable radio 12 are configured to detect certain signals associated with the connection of the external power supply terminals 44a,b; the hands-free request terminals 47a,b; and the external antenna terminals of the portable radio 12 and vehicle kit 14. More specifically, connection of the external power supply terminals 44a,b results in the PWRSRC signal being input to and detected by the radio and logic unit 77. Connection of the hands-free request terminals 47a,b results in hands-free request signal being input to and detected by the radio and logic unit 77. Connection of the external antenna terminals 50a,b, results in an external antenna signal being input to and detected by radio and logic unit 77. As discussed below, the radio and logic unit 77 generates an operable-connection control signal or a non operable-connection control signal in response to the detection of the presence or absence of these signals. The operable control signal or non-operable control signal is transmitted to the display 66 and/or the external speaker 22 to generate an appropriate alert to the user indicating either an operable-connection or non-operable connection between the portable radio 12 and vehicle kit 14.

Referring to FIG. 4, the general operation of portable radio 12 and vehicle kit 14 for generating an operable-connection alert or non-operable-connection alert is shown. Upon turning on portable radio 12, the radio and logic unit 77 determines if a hands-free-request signal and an external power signal are present (block 100). A hands-free-request signal is generated upon connection of the hands-free request terminals 47a,b which connect the hands-free request circuit 47c. Upon connection of the hands-free request circuit 47c, the hands-free request circuit 47c is grounded at ground 55 resulting in a hands-free-request signal that is detected by the radio and logic unit 77.

The external power signal is generated upon connection of the external power signal terminals 44a,b. The connection of the external power supply terminals 44a,b completes the external power supply circuit 44c and a PWRSRC signal is placed on the external power supply circuit 44c. The radio and logic unit 77 detects the PWRSRC signal which indicates the presence of the external power supply 16. The radio and logic unit 77 continuously monitors for the hands-free-request signal and external power signal.

In an alternate embodiment, the presence of an external power signal is determined by measuring for an increase in DCIN inputted into radio and logic unit 77. When portable radio 12 is not connected to external power supply 16, a DCIN signal of typically 6.0 volts is supplied by radio battery 64. Upon connection of external power supply 16, a DCIN signal is provided to radio and logic unit 77 at an increased voltage of approximately 7.0 volts. The radio and logic unit 77 measures for an increase in the inputted DCIN and determines that an external power signal is present in response to the detection of a voltage increase of approximately 0.5 to 1.5 volts.

Upon detection of both the hands-free-request signal and external power signal, the radio and logic unit 77 determines if an external antenna signal is present (block 102). An external antenna signal is a radio signal that is received by external antenna 24 and passed to radio and logic unit 77. The step of determining whether an external antenna signal is present (block 102) will be discussed below in more detail with reference to FIG. 5. If the radio and logic unit 77 determines the presence of an external antenna signal (block 102), then an operable-connection control signal is generated by radio and logic unit 77 (block 104). The operable-connection control signal is transmitted to both the display 66 and the external speaker 22. The display 66 visually displays an operable-connection alert and the external speaker 22 sounds an audio operable-connection alert in response to the operable-connection signal (block 106). The operable-connection alert displayed by display 66 and sounded by external speaker 22 indicates to the user that the portable radio 12 and vehicle kit 14 have been operably-connected.

If the radio and logic unit 77 does not detect the presence of an external antenna signal after the hands-free-request signal and external power signal have been detected, then a non-operable-connection signal is generated by the radio and logic unit 77 (block 108). The display 66 displays a non-operable-connection alert and the external speaker 22 sounds a non-operable-connection alert in response to the non-operable-connection control signal (block 110). The non-operable-connection alert generated by the display 66 and external speaker 22 differs from the operable-connection alert generated by the display 66 and/or external speaker 22. The non-operable-connection alert indicates to the user that the portable radio 12 has not been fully connected to vehicle kit 14 or is not functioning in some other manner.

The radio and logic unit 77 detects the presence of an external antenna signal (block 102) according to a process shown in FIG. 5. After turning on portable radio 12, timer 75 is started. In addition, portable radio 12 measures received signal strength indicator (RSSI) values at periodic intervals of 20 to 100 milliseconds (block 114). RSSI is a signal strength measurement which is proportional to the log of the received signal amplitude (0 VDC to VRSSI (max)). The radio and logic unit 77 uses timer 75 to determine if the hands-free-request signal and external power signal are detected within a predetermined time of turning-on portable radio 12. The predetermined time is between 500 milliseconds to 1 second.

Block 116 is used to determine whether portable radio 12 was turned on prior to being inserted into the vehicle kit 14 or after portable radio 12 was inserted into vehicle kit 14. If the hands-free-request signal and external power signal are detected after the predetermined time of turning on portable radio 12, the portable radio 12 was turned-on prior to being connected to the vehicle kit 14. When the portable radio 12 has been turned on prior to being inserted into the vehicle kit 14, the external antenna signal can be detected by looking for an improvement in the measured RSSI after the portable radio 12 has been operable-connected to the external antenna 24. An improvement in measured RSSI should be seen by the portable radio 12 after connection with vehicle kit 14 because the external antenna 24 will provide external antenna signals received outside of the vehicle in which the portable radio 12 is located.

Prior to connection of the portable radio to the vehicle kit 14, the portable radio 12 only receives radio signals via the radio antenna 73. Because the portable radio 12 is enclosed within the body of the vehicle, the radio signal received by the radio antenna 73 is substantially attenuated by the vehicle and the RSSI measured is relatively low. By connecting the portable radio 12 to the vehicle kit 14, the portable radio 12 receives radio signals received by the external antenna 24 which is located outside of the vehicle such that the received radio signals are not attenuated by the vehicle. These radio signals or external antenna signals are connected to the radio and logic unit 77 by the transmit and receive circuits 50c. Accordingly, the RSSI measured by radio and logic unit 77 should be larger than the RSSI measured by the portable radio 12 prior portable radio 12 being connected with vehicle kit 14.

In the case where the portable radio 12 is turned-on prior to being inserted into vehicle kit 14, the presence of an external antenna signal is determined by detecting the increase in RSSI measured after the portable radio 12 has been connected to the vehicle kit 14. An increase in measured RSSI is detected by first storing measured RSSI values in a first memory location in memory 76 (block 118). The measured RSSI values are sequentially stored in the first memory location until the hands-free-request signal and external power signal are detected (block 120).

Upon detection of the hands-free-request signal and external power signal, the last measured RSSI value stored prior to detection of the hands-free-request signal and external power signal is retained in the first memory location. An RSSI value measured after the detection of the hands-free-request signal and external power signal is then stored in a second memory location of memory 76 (block 122). The RSSI value retained in the first memory location is indicative of the measured RSSI prior to the connection of portable radio 12 to vehicle kit 14 and can be referred to as a pre-connection RSSI value. Likewise, the RSSI value stored in the second memory location is indicative of the measured RSSI after the connection of portable radio 12 to vehicle kit 14 and can be referred to as a post-connection RSSI value.

The radio and logic unit 77 compares the post-connection RSSI value with the pre-connection RSSI value to determine if there has been an increase in RSSI after the connection or portable radio 12 to vehicle kit 14 (block 124). If the post-connection RSSI value is greater than the pre-connection RSSI value then an operable-connection control signal is generated by radio and logic unit 77 (block 104). If the post-connection RSSI value is not greater than the pre-connection RSSI value then a non-operable-connection control signal is generated by radio and logic unit 77 (block 108). The operable-connection alert is generated by the display 66 and external speaker 22 in response to the operable-connection control signal, and the non-operable-connection alert is generated by the display 66 and external speaker 22 in response to the non-operable-connection control signal.

If the hands-free-request signal and external power signal are detected prior to the predetermined time after turning-on portable radio 12, the portable radio 12 was turned on subsequent to being connected to the vehicle kit 14. A portable radio 12 turned-on after having been inserted into the vehicle kit 14 does not necessarily show an increase in measured RSSI. Accordingly, connection of the external antenna to the portable radio 12 cannot be effectively determined by detecting an increase in RSSI power.

In the case where the portable radio 12 is turned on after having been inserted into the vehicle kit 14, a different process is taken to determine whether the external antenna terminals 50a,b have been connected and the external antenna 24 is operably connected to portable radio 12. Referring to FIG. 5 (blocks 126 and 128), RSSI is measured a selected time after the hands-free-request signal and external power signal are detected and is stored in a second memory location (block 126). The selected time period after detection of the hands-free-request signal and external power source signal is between 100 and 200 milliseconds, and is selected to allow radio and logic unit 77 sufficient time to initialize and make an accurate measurement of RSSI. Initialization of portable radio 12 includes processes such as initializing memory and hardware.

The stored post connection RSSI value is compared with a stored reference RSSI value (block 128). The stored reference RSSI value is a minimum RSSI value that should be typically measured if external antenna 24 is connected to the portable radio 12. The reference RSSI value can range from 1.3 to 4.0 volts. If the post-connection RSSI value is greater than or equal to the stored reference RSSI value, then it is determined that the external antenna signal is present and an operable-connection control signal is generated by radio and logic unit 77 (block 104). If the post-connection RSSI value is less than the stored reference RSSI value, then a non-operable-connection control signal is generated by radio and logic unit 77 (block 108).

The present invention generates an alert to a user indicative of whether an operable or non-operable connection has been made between a portable radio 12 and vehicle kit 14. An operable-connection is determined by detecting selected signals indicative of an electrical connection between key terminals of the portable radio 12 and vehicle kit 14. A non-operable connection is determined by a failure to detect the selected terminals.

In alternate embodiments of the present invention, the signals that must be present to indicate an operable-connection can vary. For example, an alternate embodiment can be provided where an operable-connection is determined by detecting the presence of an external antenna signal without considering the presence of an external power signal or hands-free-request signal. Likewise, an alternate embodiment can be provided where an operable-connection is determined by detecting the presence of an external power signal without considering the presence of an external antenna signal or hands-free-request signal. In other alternative embodiments selected signals such as DCIN, SWDC5, DTMS, and DFMS can be used in determining an operable or non-operable connection between portable radio 12 and vehicle kit 14. In other alternate embodiments, data auxiliary unit 26 can also be used to generate one or more of the selected signals used in determining an operable or non-operable connection between portable radio 12 and vehicle kit 14.

While the present invention has been described with respect to a portable radio 12 connected to a vehicle kit 14, those skilled in the art will recognize that the present invention is also applicable to a portable radio 12 connected to communication accessories such as battery chargers, portable hands-free units, modems, faxes, etc. The present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is merely for purposes of providing a full and enabling disclosure of the invention. Accordingly, it is intended that the invention be limited only by the spirit and scope of the claims appended hereto.

What is claimed is:

1. A method for indicating whether an operable connection or non-operable connection has been made between a portable radio and vehicle kit, comprising the steps of:

a) determining if a hands-free-request signal is present;

b) determining if an external power signal is present;

c) determining if an external antenna signal is present;

d) generating a first alert indicative of an operable connection or non-operable connection between the portable radio and the vehicle kit in response to the determination of the presence of the hands-free-request signal, external power signal, and external antenna signal; and e) wherein the first alert is indicative of an operable-connection and is generated in response to a determination that the hands-free-request signal, external power signal, and external antenna signal are present, and further including the step of generating a second alert signal indicative of a non-operable connection between the portable radio and the vehicle kit in response to a determination that the external power signal and hands-free-request signal are present and that the external antenna signal is not present.

2. A method for indicating whether an operable connection or non-operable connection has been made between a portable radio and a vehicle kit, comprising the steps of:

a) determining if a hands-free-request signal is present;
b) determining if an external power signal is present;
c) determining if an external antenna signal is present, wherein the step of determining if an external antenna signal is present includes the steps of:
  (i) determining a pre-connection RSSI value indicative of an RSSI measurement made prior to determining the presence of the hands-free-request signal and external power signal;
  (ii) determining a post-connection RSSI value indicative of an RSSI measurement made after determining the presence of the hands-free-request signal and external power signal;
  (iii) comparing the post-connection RSSI value with the pre-connection RSSI value;
  (iv) wherein the presence of the external antenna signal is determined in response to the comparison of the post-connection RSSI value with the pre-connection RSSI value; and
d) generating a first alert indicative of an operable connection or non-operable connection between the portable radio and the vehicle kit in response to the determination of the presence of the hands-free-request signal, external power signal, and external antenna signal.

3. A method for indicating whether an operable connection or non-operable connection has been made between a portable radio and a vehicle kit, comprising the steps of:

a) determining if a hands-free-request signal is present;
b) determining if an external power signal is present;
c) determining if an external antenna signal is present, wherein the step of determining if an external antenna signal is present includes the steps of:
  (i) determining a post-connection RSSI value indicative of an RSSI measurement made after determining the presence of the hands-free-request signal and external power signal;
  (ii) comparing the post-connection RSSI value with a predetermined reference RSSI value;
  (iii) wherein the presence of the external antenna signal is determined in response to the comparison of the post-connection RSSI value with the reference RSSI value; and
d) generating a first alert indicative of an operable connection or non-operable connection between the portable radio and the vehicle kit in response to the determination of the presence of the hands-free-request signal, external power signal, and external antenna signal.

4. A method for indicating whether an operable connection or non-operable connection has been made between a portable radio and a vehicle kit, comprising the steps of:

a) determining if a hands-free-request signal is present;
b) determining if an external power signal is present;
c) determining if an external antenna signal is present;
d) generating a first alert indicative of an operable connection or non-operable connection between the portable radio and the vehicle kit in response to the determination of the presence of the hands-free-request signal, external power signal, and external antenna signal; and
e) wherein the step of determining if an external antenna signal is present includes the steps of:
  (1) determining if the hands-free-request signal and external power signal are present within a predetermined time period after turning-on the power of the portable radio;
  (2) if the hands-free-request signal and external power signal are present within the predetermined time period, determining the presence of the external antenna signal with steps comprising:
    (i) determining a post-connection RSSI value indicative of an RSSI measurement made after determining the presence of the hands-free-request signal and external power signal;
    (ii) comparing the post-connection RSSI value with a predetermined reference RSSI value;
    (iii) wherein the presence of the external antenna signal is determined in response to the comparison of the post-connection RSSI value with the reference RSSI value;
  (3) if the hands-free-request signal and external power supply signal are not present within the predetermined time period, determining the presence of the external antenna signal with steps comprising:
    (i) determining a pre-connection RSSI value indicative of an RSSI measurement made prior to determining the presence of the hands-free-request signal and external power signal;
    (ii) determining a post-connection RSSI value indicative of an RSSI measurement made after determining the presence of the hands-free-request signal and external power signal;
    (iii) comparing the post-connection RSSI value with the pre-connection RSSI value; and
    (iv) wherein the presence of the external antenna signal is determined in response to the comparison of the post-connection RSSI value with the pre-connection RSSI value.

5. A method for indicating whether an operable connection or non-operable connection has been made between a portable radio and a vehicle kit, comprising the steps of:

a) determining if an external antenna signal is present;
b) wherein the step of determining if an external antenna signal is present includes the steps of:
  (i) determining a pre-connection RSSI value indicative of an RSSI measurement made prior to determining the presence of the hands-free-request signal and external power signal;
  (ii) determining a post-connection RSSI value indicative of an RSSI measurement made after determining the presence of the hands-free-request signal and external power signal;
  (iii) comparing the post-connection RSSI value with the pre-connection RSSI value; and
  (iv) wherein the presence of the external antenna signal is determined in response to the comparison of the post-connection RSSI value with the pre-connection RSSI value; and c) generating a first alert indicative of an operable connection or non-operable connection between the portable radio and the vehicle kit in response to the determination of the presence of the external antenna signal.

6. A method for indicating whether an operable connection or non-operable connection has been made between a portable radio and a vehicle kit, comprising the steps of:
   a) determining if an external antenna signal is present;
   b) wherein the step of determining if an external antenna signal is present includes the steps of:
      (i) determining a post-connection RSSI value indicative of an RSSI measurement made after determining the presence of the hands-free-request signal and external power signal;
      (ii) comparing the post-connection RSSI value with a predetermined reference RSSI value;
      (iii) wherein the presence of the external antenna signal is determined in response to the comparison of the post-connection RSSI value with the reference RSSI value; and
   c) generating a first alert indicative of an operable connection or non-operable connection between the portable radio and the vehicle kit in response to the determination of the presence of the external antenna signal.

7. A method for indicating whether an operable connection or non-operable connection has been made between a portable radio and a vehicle kit, comprising the steps of:
   a) determining if an external antenna signal is present;
   b) wherein the step of determining if an external antenna signal is present includes the steps of:
      (1) determining if the hands-free-request signal and external power signal are present within a predetermined time period after turning-on the power of the portable radio;
      (2) if the hands-free-request signal and external power signal are present within the predetermined time period, determining the presence of the external antenna signal with steps comprising:
         (i) determining a post-connection RSSI value indicative of an RSSI measurement made after determining the presence of the hands-free-request signal and external power signal,
         (ii) comparing the post-connection RSSI value with a predetermined reference RSSI value,
         (iii) wherein the presence of the external antenna signal is determined in response to the comparison of the post-connection RSSI value with the reference RSSI value;
      (3) if the hands-free-request signal and external power supply signal are not present within the predetermined time period, determining the presence of the external antenna signal with steps comprising:
         (i) determining a pre-connection RSSI value indicative of an RSSI measurement made prior to determining the presence of the hands-free-request signal and external power signal;
         (ii) determining a post-connection RSSI value indicative of an RSSI measurement made after determining the presence of the hands-free-request signal and external power signal;
         (iii) comparing the post-connection RSSI value with the pre-connection RSSI value; and
         (iv) wherein the presence of the external antenna signal is determined in response to the comparison of the post-connection RSSI value with the pre-connection RSSI value; and
   c) generating a first alert indicative of an operable connection or non-operable connection between the portable radio and the vehicle kit in response to the determination of the presence of the external antenna signal.

8. A portable radio for indicating whether an operable connection or non-operable connection has been made between a portable radio and a vehicle kit, comprising:
   a) means for determining if an external antenna signal is present;
   b) wherein the means for determining if an external antenna signal is present includes:
      (i) means for determining a pre-connection RSSI value indicative of an RSSI measurement made prior to determining the presence of the hands-free-request signal and external power signal;
      (ii) means for determining a post-connection RSSI value indicative of an RSSI measurement made after determining the presence of the hands-free-request signal and external power signal;
      (iii) means for comparing the post-connection RSSI value with the pre-connection RSSI value;
      (iv) wherein the presence of the external antenna signal is determined in response to the comparison of the post-connection RSSI value with the pre-connection RSSI value; and
   c) means for generating a first alert indicative of an operable connection or non-operable connection between the portable radio and the vehicle kit in response to the determination of the presence of the external antenna signal.

9. A portable radio for indicating whether an operable connection or non-operable connection has been made between a portable radio and a vehicle kit, comprising:
   a) means for determining if an external antenna signal is present;
   b) wherein the means for determining if an external antenna signal is present includes:
      (i) means for determining a post-connection RSSI value indicative of an RSSI measurement made after determining the presence of the hands-free-request signal and external power signal;
      (ii) means for comparing the post-connection RSSI value with a predetermined reference RSSI value;
      (iii) wherein the presence of the external antenna signal is determined in response to the comparison of the post-connection RSSI value with the reference RSSI value; and
   c) means for generating a first alert indicative of an operable connection or non-operable connection between the portable radio and the vehicle kit in response to the determination of the presence of the external antenna signal.

* * * * *